E. S. RAFF.

INKSTAND.

No. 11,234. Reissued Apr. 26, 1892.

Witnesses.
E. Byrn Gilchrist.
C. H. Avery

Inventor.
Edward S. Raff
By Legget & Legget
his Attorneys

THE NORRIS PETERS CO., PHOTO-LITHO., WASHINGTON, D. C.

UNITED STATES PATENT OFFICE.

EDWARD S. RAFF, OF CANTON, OHIO.

INKSTAND.

SPECIFICATION forming part of Reissued Letters Patent No. 11,234, dated April 26, 1892.

Original No. 430,194, dated June 17, 1890. Application for reissue filed January 20, 1892. Serial No. 418,715.

*To all whom it may concern:*

Be it known that I, EDWARD S. RAFF, a citizen of the United States, and a resident of Canton, county of Stark, State of Ohio, have invented a new and useful Improvement in Inkstands, of which the following is a full, clear, and exact description, reference being had to the accompanying drawings, making part of this specification.

My invention relates to improvements in an article of manufacture; and it consists in providing in an inkstand a fountain or receptacle to hold ink that may be so balanced or poised as to yield or swing when the pen is placed in the stand, which movement will cause a supply of ink to flow from the body or the fountain to the pen, and back into the fountain when the pen is removed, by which a supply of fresh ink is always provided for the pen, and the whole body of ink in the fountain moved each time the pen is inked, by which movement the ink is prevented from settling, and as a result of such frequent movement is always in order for use.

With these ends in view my invention consists of certain features of construction and combinations of parts, as will be hereinafter described, and pointed out in the claims.

Figure 2:
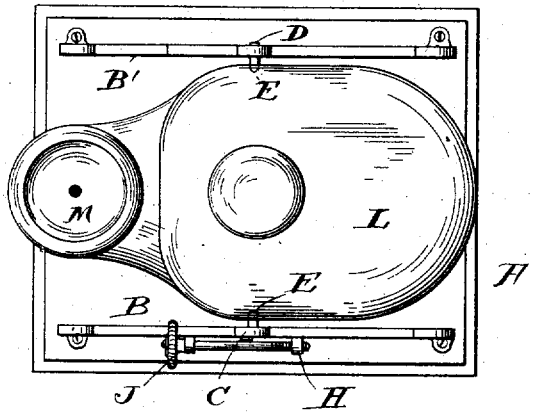
Figure 1:
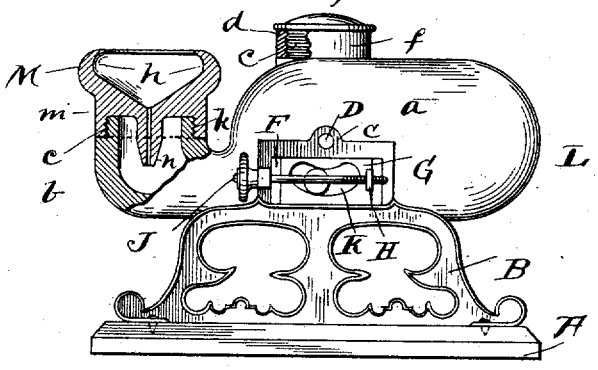
Figure 3:
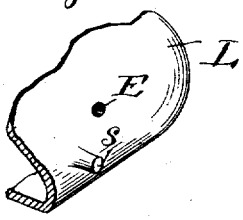

Figure 1 of the accompanying drawings is a side elevation, partly in section, of an inkstand illustrating my invention. Fig. 2 is a plan view, and Fig. 3 is a perspective, of a fragment of the ink-fountain.

A is a base, which may be made of any suitable material, having side frames B and B′, at the top portion of which is provided a threaded perforation C, in which is turned a threaded stud D, the inner end of which is coned to correspond with a conical depression E. (Shown in Figs. 2 and 3.)

At the upper portion of side piece B there is provided an oblong aperture F, in which is placed a slide G, having at its end portions a flange H, having a threaded perforation adapted to receive the threaded portion of the thumb-screw J, by which the slide G may be moved back and forth in the aperture F. In said slide there is provided a curved slot K, hereinafter explained.

A fountain or ink-holder L, preferably made of glass, is provided, having a hollow body portion *a*, a neck portion *b*, projected outwardly, and about the upper end portion of which is provided an annular screw-thread *c*, and on the top portion of the body L is provided a flanged aperture *d*, said flange having an annular screw-thread *e*, to which is fitted a metal cap *f*, having a similar screw.

A mouth-piece M, made, preferably, of hard rubber and of the form shown in the drawings, is provided, said piece having upwardly-projected walls *h*, a downwardly-projected neck portion *m*, having a screw-thread K, similar and adapted to the thread *c* on the neck of the fountain, and a central and downwardly-projected tube portion *n*, the aperture of which is small, as shown.

On each side of the fountain L and diametrically opposite are provided conical depressions E, adapted to receive the ends of the studs D, and on one side thereof is provided an outwardly-projected stud *s*, as shown in Fig. 3.

The ink-fountain, as described, is placed in the supporting stand or frame composed of the base A and side frames B and B′, the inner ends of the studs D placed in the depressions E, and the stud *s* in the curved slot K.

In operation a sufficient amount of ink is passed through the aperture provided therefor into the fountain to immerse or cover the end of the tube *n* to a point indicated by the dotted line, the swing or tip of the fountain to be regulated or gaged by the slide G, which may be moved back or forward and adjusted to the amount of ink in the fountain, so as to prevent an excess rising through the tube *n*, and by keeping the end of the said tube constantly immersed air-bubbles rising above the tube into the mouth M will be prevented, and by the frequent swinging movement of the fountain the ink is not liable to "settle," as is the case with a stationary fountain or one that is not so moved at every inking of the pen. To ink the pen, it is placed in the mouth M, and by a gentle downward pressure the fountain will swing on its pivotal connection with the supporting-frame, the neck and mouth down and the rear portion of the body up, until such movement is arrested by the stud *s* coming in contact with the rear end of the slot K. When a desired amount of ink has flowed from the fountain up through the tube *n* into the mouth and when the pen has been inked and removed, the fountain will swing back into its normal position, as shown in Fig. 1. By the use of the thumb-screw J the tip of the fountain may be regulated by moving the slide G backward or forward to meet the stud *s* sooner or later in the course of the swing of the fountain.

What I claim is—

1. As an article of manufacture, an inkstand comprising a pivotally-supported ink fountain or receptacle adapted to move the body of ink with each tip or swing of the fountain, in combination with an adjustable stop for limiting the depression of the mouth of the ink-fountain, substantially as and for the purpose set forth.

2. As an article of manufacture, an inkstand comprising a support, an ink-fountain pivoted thereto, and a stud or projection on one of said parts projecting into an opening in the other for limiting the swing of the fountain, substantially as set forth.

3. As an article of manufacture, an inkstand comprising an ink fountain or receptacle pivotally supported and poised or balanced in such a manner as to yield or swing by a downward pressure of the pen on the mouth of the fountain and upon the removal of the pen to swing back or return to its normal position by gravity, in combination with an adjustable stop for limiting the depression of the mouth of the fountain, substantially as and for the purpose set forth.

4. As an article of manufacture, an inkstand comprising a pair of upright frames or members and an ink fountain or receptacle pivotally hung to and between said upright frames or members and adapted to move the body of the ink with each tip or swing or the fountain, the ink-fountain at the forward end having a mouth and a narrow opening or aperture establishing open communication between the interior of the body of the fountain and the mouth, the ink-fountain having a flanged opening in the top thereof, and a cap for said flanged opening, substantially as set forth.

5. As an article of manufacture, an inkstand having a support consisting of a base A and side frames B B′, said frames having at their apex pivots D and side frame B having at its upper portion a slot F and slide G, adapted to be moved back and forth therein by the thumb-screw J, and an ink-fountain L, pivotally secured in said frame to be tipped or swung on said pivots and to be adjusted by the thumb-screw and slide, substantially as described.

6. In an inkstand, the supporting-frame described and an ink-fountain pivotally secured therein, said fountain having a body portion L, depressions E, diametrically opposite, a stud, as *s*, to engage an adjustable portion of said frame, a neck portion *b*, surmounted by a hard-rubber mouth-piece having a central tube portion *n*, and means for adjusting the swing of said fountain in said frame, substantially as described, and for the purpose set forth.

In testimony whereof I have hereunto set my hand this 7th day of December, A. D. 1891.

EDWARD S. RAFF.

Witnesses:
JAMES E. FLOHR,
ROBERT K. FAST.